United States Patent
Stuntebeck et al.

(10) Patent No.: US 9,413,754 B2
(45) Date of Patent: Aug. 9, 2016

(54) AUTHENTICATOR DEVICE FACILITATING FILE SECURITY

(71) Applicant: AirWatch LLC, Atlanta, GA (US)

(72) Inventors: Erich Peter Stuntebeck, Marietta, GA (US); Kar Fai Tse, Peachtree Corners, GA (US); Chen Lu, Sandy Springs, GA (US); Chaoting Xuan, Duluth, GA (US)

(73) Assignee: AirWatch LLC, Palo Alto, CA (US)

( * ) Notice: Subject to any disclaimer, the term of this patent is extended or adjusted under 35 U.S.C. 154(b) by 41 days.

(21) Appl. No.: 14/580,653

(22) Filed: Dec. 23, 2014

(65) Prior Publication Data

US 2016/0182495 A1 Jun. 23, 2016

(51) Int. Cl.
*H04L 29/06* (2006.01)

(52) U.S. Cl.
CPC ........ *H04L 63/0846* (2013.01); *H04L 63/0435* (2013.01); *H04L 63/0492* (2013.01); *H04L 63/061* (2013.01); *H04L 63/0823* (2013.01)

(58) Field of Classification Search
CPC ............ H04L 63/0846; H04L 63/0435; H04L 63/0492; H04L 63/061; H04L 63/0823
USPC ....................................................... 713/156
See application file for complete search history.

(56) References Cited

U.S. PATENT DOCUMENTS

| | | | |
|---|---|---|---|
| 5,029,207 A * | 7/1991 | Gammie | H04N 7/1675 348/E7.056 |
| 5,574,786 A | 11/1996 | Dayan et al. | |
| 5,604,800 A * | 2/1997 | Johnson | G06F 21/34 38/23 |
| 5,937,066 A * | 8/1999 | Gennaro | H04L 9/0841 380/286 |
| 5,987,609 A | 11/1999 | Hasebe | |
| 6,021,492 A | 2/2000 | May | |
| 6,023,708 A | 2/2000 | Mendez et al. | |
| 6,038,666 A * | 3/2000 | Hsu | G07C 9/00087 380/285 |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,233,341 B1 | 5/2001 | Riggins | |
| 6,317,829 B1 * | 11/2001 | Van Oorschot | G06Q 20/3672 713/155 |
| 6,377,792 B1 * | 4/2002 | Brown | H04W 12/12 455/410 |
| 6,560,772 B1 | 5/2003 | Slinger | |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |

(Continued)

FOREIGN PATENT DOCUMENTS

| | | |
|---|---|---|
| CA | 2149337 | 6/1994 |
| GB | 2346716 | 8/2000 |

(Continued)

OTHER PUBLICATIONS

Office Action mailed Nov. 30, 2015 in U.S. Appl. No. 13/841,853.

(Continued)

*Primary Examiner* — Michael S McNally

(57) ABSTRACT

Disclosed are various embodiments for facilitating the encryption of files as well as facilitating requiring a user to employ an authenticator device in order to access a file that is encrypted or otherwise secured. The authenticator device can provide an authenticator code in which a security key used to access a secured file can be embedded. An additional layer of encryption can also be applied in the authenticator code.

21 Claims, 8 Drawing Sheets

(56) References Cited

U.S. PATENT DOCUMENTS

| | | |
|---|---|---|
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,430,757 B1 | 9/2008 | Chari et al. |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,496,957 B2 | 2/2009 | Howard et al. |
| 7,539,665 B2 | 5/2009 | Mendez |
| 7,543,146 B1 | 6/2009 | Karandikar et al. |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B2 | 4/2010 | Maurya et al. |
| 7,702,785 B2 | 4/2010 | Bruton, III et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 7,991,697 B2 | 8/2011 | Fransdonk |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,108,687 B2 | 1/2012 | Ellis et al. |
| 8,117,344 B2 | 2/2012 | Mendez et al. |
| 8,150,431 B2 | 4/2012 | Wolovitz et al. |
| 8,214,862 B1 | 7/2012 | Lee et al. |
| 8,225,381 B2 | 7/2012 | Lemke |
| 8,621,208 B1 * | 12/2013 | Hu .................. H04L 63/045 705/51 |
| 2002/0013721 A1 | 1/2002 | Dabbiere et al. |
| 2002/0049580 A1 | 4/2002 | Kutaragi et al. |
| 2002/0157019 A1 | 10/2002 | Kadyk et al. |
| 2002/0199119 A1 * | 12/2002 | Dunnion ............. H04L 12/58 726/4 |
| 2003/0065950 A1 | 4/2003 | Yarborough |
| 2003/0110084 A1 | 6/2003 | Eberhard et al. |
| 2003/0204716 A1 | 10/2003 | Rockwood et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0097032 A1 | 5/2005 | Benco et al. |
| 2005/0097327 A1 | 5/2005 | Ondet et al. |
| 2005/0246192 A1 | 11/2005 | Jauffred et al. |
| 2006/0013566 A1 | 1/2006 | Nakamura |
| 2006/0190984 A1 | 8/2006 | Heard et al. |
| 2007/0033397 A1 | 2/2007 | Phillips, II et al. |
| 2007/0130473 A1 | 6/2007 | Mazotas |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0261099 A1 | 11/2007 | Broussard et al. |
| 2007/0288637 A1 | 12/2007 | Layton et al. |
| 2008/0010689 A1 | 1/2008 | Ooi et al. |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2008/0301057 A1 | 12/2008 | Oren |
| 2008/0307219 A1 | 12/2008 | Karandikar |
| 2008/0318548 A1 | 12/2008 | Bravo et al. |
| 2009/0036111 A1 | 2/2009 | Danford et al. |
| 2009/0144632 A1 | 6/2009 | Mendez |
| 2009/0198997 A1 | 8/2009 | Yeap et al. |
| 2009/0203375 A1 | 8/2009 | Gisby et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0083359 A1 | 4/2010 | Readshaw et al. |
| 2010/0100641 A1 | 4/2010 | Quinlan et al. |
| 2010/0120450 A1 | 5/2010 | Herz |
| 2010/0138667 A1 | 6/2010 | Adams et al. |
| 2010/0144323 A1 | 6/2010 | Collins et al. |
| 2010/0146269 A1 | 6/2010 | Baskaran |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0039506 A1 | 2/2011 | Lindahl et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0198547 A1 | 8/2012 | Fredette et al. |
| 2012/0272287 A1 | 10/2012 | Kuhlke et al. |
| 2013/0061307 A1 | 3/2013 | Livne |
| 2013/0152169 A1 | 6/2013 | Stuntebeck |
| 2013/0165232 A1 | 6/2013 | Nelson et al. |

(56) References Cited

U.S. PATENT DOCUMENTS

| | | | |
|---|---|---|---|
| 2014/0025256 A1 | 1/2014 | Armitage et al. | |
| 2014/0047240 A1* | 2/2014 | Kato | H04L 9/0866 713/171 |
| 2014/0068717 A1 | 3/2014 | Mayes et al. | |
| 2014/0143852 A1 | 5/2014 | Cottrell et al. | |
| 2014/0177495 A1 | 6/2014 | Mallikarjunan et al. | |
| 2014/0223182 A1* | 8/2014 | Avanzi | H04L 9/0838 713/171 |

FOREIGN PATENT DOCUMENTS

| | | |
|---|---|---|
| GB | 2361558 | 10/2001 |
| WO | WO9600485 | 1/1996 |
| WO | WO0003316 | 1/2000 |
| WO | WO0241661 | 5/2002 |
| WO | WO2010052669 | 5/2010 |

OTHER PUBLICATIONS

International Search Report for PCT/US2014/025256 mailed Jul. 3, 2014.

Non-Final Office Action cited in U.S. Appl. No. 13/316,073 dated Jan. 18, 2013.

Asynchrony Software, Inc., , "PDA Defense User Guide", 726, 2002.

Belani, Eshwar et al., "The CRISIS Wide Area Security Architecture", 726, 1998.

Benaloh, Josh et al., "Patient Controlled Encryption: Ensuring Privacy of Electronic Medical Records", 726, Nov. 13, 2009.

Fox, Armando et al., "Security on the Move: Indirect Authentication Using Kerberos", 726, 1996.

Menaria, Pankaj et al., "Security in Mobile Database Systems", 707, 726,Mar. 17, 2011.

Pfitzmann, Andreas et al., "Mobile User Devices and Security Modules: Design for Trustworthiness", 726, Feb. 5, 1996.

Steiner, Jennifer , "Kerberos: An Authentication Service for Open Network Systems", 726, Jan. 12, 1988.

Strunk, John et al., "Self-Securing Storage: Protecting Data in Compromised Systems", Symposium on Operating Systems Design and Implementation, 726, 2000.

Non-final Office Action cited in U.S. Appl. No. 13/841,853 mailed Jan. 28, 2015.

Office Action mailed Jul. 9, 2015 in U.S. Appl. No. 13/841,853, filed Mar. 15, 2013.

* cited by examiner

AUTHENTICATOR DEVICE FACILITATING FILE SECURITY

BACKGROUND

An enterprise and/or its users may wish to secure documents or other files by requiring a password or another authentication mechanism that is designated as a requirement in order to access a particular file. In some cases a document can be protected with a password or key that must be supplied in order to open or access the document. In some cases, if such a password is compromised, access to a particular document or file can also be compromised.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
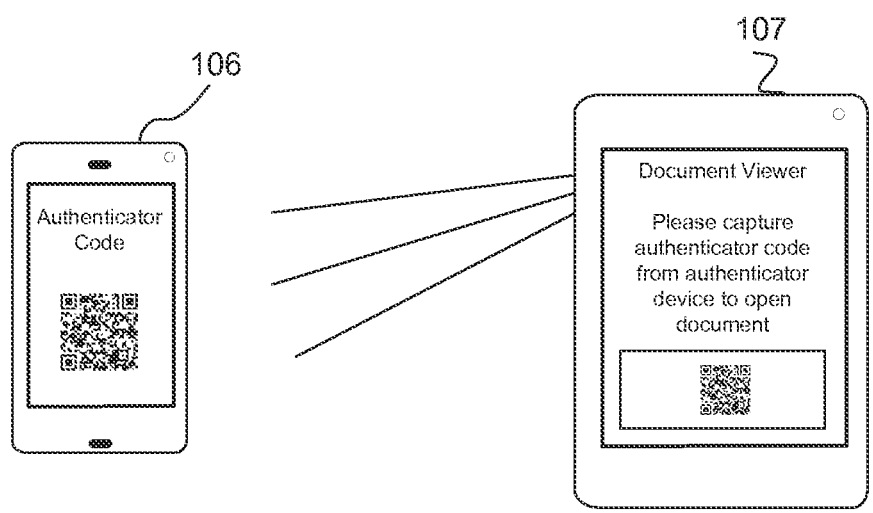
FIG. 1 is a drawing of an example scenario according to various embodiments of the present disclosure.

An enterprise or users of an enterprise may wish to secure files or documents to prevent access by unauthorized users. Files may be secured by applying an encryption process in which the file is encrypted utilizing a security key such that in order to be accessed, the file must be decrypted with the security key. In other words, a symmetric encryption process can be utilized. In some embodiments, the security key can encrypt a collection of file keys rather than a security key that is specific to the file. In some scenarios, a user may wish to utilize public key-private key encryption methodologies where a file is encrypted using a public key and must be decrypted using a private key that corresponds to the public key in order for the file to be accessed, or an asymmetric encryption process. Files can also be secured by utilizing a password protection process that may not involve encryption of the file. For example, a binary file that is encoded in a proprietary or open format that is viewable by a reader or editor, such as a file format supported by MICROSOFT WORD, ADOBE ACROBAT, or other software programs, can be password protected such that in order to be accessed using a reader or editor program, a correct password must be supplied by a user attempting to access the file.

Accordingly, access to files that are secured using such methodologies may be compromised in the event that a password or other pre-shared secret is compromised. Therefore, embodiments of the disclosure can employ an authenticator computing device (hereinafter "authenticator device") that is separate from a computing device that is attempting to access a secured file (hereinafter "access device"). In order to access a secured file on an access device, embodiments of the disclosure can require that a security key must be obtained from such an authenticator device. In some embodiments, such a security key may be received from the authenticator device by a localized communication interface, such as via a quick response (QR) code or any other barcode or visual identifier displayed on a display of the authenticator device, communication via a localized network interface, such as BLUETOOTH, near-field communication (NFC), radio-frequency identification (RFID), or any other localized communication mechanism.

Additionally, the security key that facilitates decryption or access to a secured file can itself be encrypted or further secured to protect against the possibility that the communication between the authenticator device and the device attempting to access the secured file is intercepted. For example, the security key can be encrypted or protected using a one-time password or a time varying token. In addition to such a one-time password, the security key can also be protected using a password, personal identification number (PIN) or a pre-shared secret that must be supplied in addition to or in combination with the one-time password in order to access the security key obtained from the authenticator device. The security key can also be encrypted with a public key that corresponds to a private key associated with a particular user or access device. Additionally, an application executed by the access device can also be configured to avoid storage or persistence of the security key in mass storage, disk, or any other non-volatile storage of the device so that subsequent attempts to access the secured file via the access device would require obtaining the security key again from the authenticator device. In some embodiments, the security key can secure a collection of keys that are in turn employed to decrypt the secured file rather than being a file-specific security key.

Accordingly, embodiments of the present disclosure can facilitate the security of files that are obtained from a server or other resource by requiring that a device on which a file is accessed communicates with an authenticator device in order to obtain an authenticator code, or a double-encrypted security key, that can be used to facilitate access or decrypt the file.

As shown in the example scenario of FIG. 1, an authenticator device 106 can comprise a smartphone, a mobile device, or any other computing device. Similarly, an access device 107 can comprise a smartphone, a mobile device, or any other computing device. The access device 107 can attempt to access or open a secured file that is stored on or otherwise accessible to the access device 107. The secured file can be encrypted or secured by a security key to which the access device 107 does not have access. Accordingly, in order to access or open the secured file, an application that facilitates access to the secured file can prompt the user to obtain an authenticator code from the authenticator device 106. The authenticator code, in embodiments of this disclosure, can comprise a multiply encrypted version of the security key. In other words, the authenticator code can be the security key with multiple layers of encryption applied. In some embodiments of the disclosure, the authenticator code can comprise a double-encrypted security key, or the security key with two layers of encryption or security applied.

The authenticator code can be obtained from the authenticator device 106 by the access device 107 via a localized networking or communication capability. In the depicted scenario of FIG. 1, such a capability includes the display by the authenticator device 106 of a data representation of the authenticator code on a display of the authenticator device 106, which can be captured by the access device 107 via a camera capability of the access device 107. For example, the authenticator code can be embedded within a quick response (QR) code or other visual data representation. As another example, the authenticator code can be transmitted to the access device 107 via a localized communication interface such as near field communication (NFC), radio-frequency identification technology, or an audible transmission where the authenticator code is embedded within an audible noise that can be captured by a microphone associated with the access device 107.

Accordingly, a secured file obtained or received by the access device 107 can be encrypted with the security key, but the security key can be initially withheld from the access device 107. The security key can be encrypted by a file server or other computing device with a public key that corresponds to a private key associated with the access device 107 or a user associated with the access device 107. The encrypted security key can be provided to the authenticator device 106, which can apply an additional encryption layer to the encrypted security key to generate the double-encrypted security key. The authenticator code can comprise the double-encrypted security key. As will be described herein, the access device 107 can decrypt the authenticator code or the double-encrypted security key in order to access a secured file.

Figure 2:
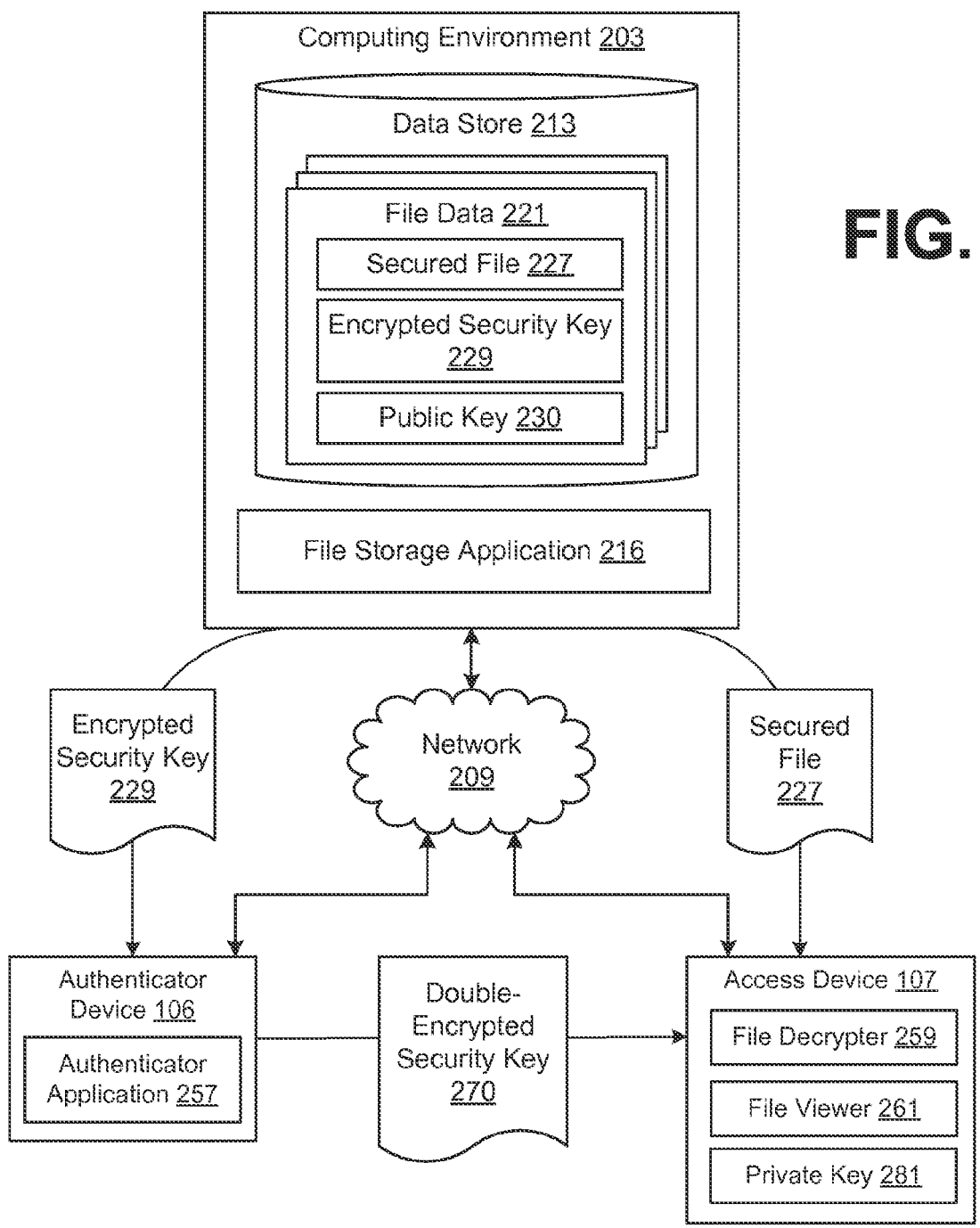
FIG. 2 is a drawing of a networked environment according to various embodiments of the present disclosure.

With reference to FIG. 2, shown is a networked environment 200 according to various embodiments. The networked environment 200 includes a computing environment 203, an authenticator device 106, and a access device 107, which are in data communication with each other via a network 209. The network 209 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks. In the depicted example of FIG. 2, the authenticator device 106 and access device 107 are shown merely for illustrative purposes to describe how embodiments of the disclosure may operate. It should be appreciated that the illustrated devices can be deployed in various ways and that the depicted illustration is non-limiting.

The computing environment 203 may comprise, for example, a server computer or any other system providing computing capability. Alternatively, the computing environment 203 may comprise a plurality of computing devices that are arranged, for example, in one or more server banks or computer banks or other arrangements. For example, the computing environments 203 may comprise a grid computing resource and/or any other distributed computing arrangement. Such computing devices may be located in a single installation or may be distributed among many different geographical locations. For purposes of convenience, the computing environment 203 is referred to herein in the singular. Even though the computing environment 203 is referred to in the singular, it is understood that a plurality of computing environments 203 may be employed in the various arrangements as described above.

Various applications and/or other functionality may be executed in the computing environment 203 according to various embodiments. Also, various data is stored in a data store 213 that is accessible to the computing device 203. The data store 213 may be representative of memory of the computing environment 203, mass storage resources of the computing environment 203, or any other storage resources on which data may be stored by the computing environment 203. The data store 213 may also be representative of a plurality of data stores 213 as can be appreciated. The data stored in the data store 213, for example, is associated with the operation of the various applications and/or functional entities described below.

The components executed by the computing environment 203, for example, include a file storage application 216 and other applications, services, processes, systems, engines, or functionality not discussed in detail herein. The file storage application 216 is executed to facilitate the storage of files on behalf of a user, an enterprise or organizational storage account, or any other entity. The file storage application 216 can facilitate access to files stored by or on behalf of users as well as the encryption and security of the files that are stored within the computing environment.

The data stored in the data store 213 includes, for example, file data 221 and potentially other data. The file data 221 can include data associated with a user or an account associated with an organization or entity. File data 221 can include information about files that are stored on behalf of a user or organization within the computing environment 203. File data 221 can also include other data and information that facilitates access to files that are stored within the computing environment 203. For example, file data 221 can also include access settings, such as authentication credentials, delegation settings (e.g., information about other users who may be provided access to the files of a particular user or organization), synchronization settings, user or organizational profile information, or any other forms of user data.

As noted above, file data 221 can include data about various files that are stored within the computing environment 203. A particular file can be stored as a secured file 227. A secured file 227 is encrypted or otherwise protected by a security key. Such a security key may or may not be stored in conjunction with the secured file 227 in the file data 221. In some embodiments, it may be desired that the security key used to encrypt and/or decrypt the file should not be stored in the data store 221 unless it is encrypted. Accordingly, in some embodiments, an encrypted form of the security key, or an encrypted security key 229 is stored with file data 221. An encrypted security key 229 can be encrypted with a public key 230 corresponding to a user, organization and/or access device 107 that is associated with the secured file 227. In other words, the security key used to encrypt the file of a user is encrypted with the public key 230 of the user and stored as the encrypted security key 229. In some embodiments, the encrypted security key 229 can correspond to a key that is employed to encrypt a collection of security keys rather than a file-specific security key.

Secured files 227 can correspond to files that can represent documents, media, or any other data that can be stored in a file system or storage accessible to the computing environment 203. A security key used to encrypt or protect a file as a secured file 227 can represent a password, encryption key, or any other data that can be used to generate an encrypted or secured version of a particular file. The public key 230 can correspond to an encryption key in an asymmetric encryption methodology such as RSA in which an encryption key used to generate encrypted data is separate from a private key that is used to decrypt data that was encrypted using the public key 230. As noted above, the encrypted security key 229 can be encrypted using the public key 230 corresponding to a user or organization to which the secured file 227 belongs.

The authenticator device 106 and access device 107 are representative of one or more devices that may be associated with a user or organization associated with a particular secured file 227 stored within the computing environment 203 and made accessible via the file storage application 216. The authenticator device 106 and/or access device 107 may comprise, for example, a processor-based system, such as a computer system, that may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The authenticator device 106 and/or access device 107 may include a display that comprises, for example, one or more devices such as liquid crystal display (LCD) displays or other types of display devices. The authenticator device 106 and/or access device 107 may also be equipped with networking capability or networking interfaces, including a localized networking or communication capability such as an NFC capability, RFID read and/or write capability, a microphone and/or speaker, or other localized communication capability.

The authenticator device 106 may be configured to execute various applications, such as an authenticator application 257. The authenticator application 257 is configured to obtain an encrypted security key 229 associated with a particular secured file 227 or a collection of security keys, one of which is associated with the secured file 227 from the file storage application 216 in response to a request on behalf of a user or organization to access one or more secured files 227 that are stored within the computing environment 203 and/or stored within a particular access device 107 of a user or enterprise. Additionally, the authenticator application 257 is also configured to generate an authenticator code, or a double-encrypted security key 270 from the encrypted security key 229. The authenticator application 257 can transmit the double-encrypted security key 270 to an access device 107 on which a user is attempting to access a secured file 227 that corresponds to the encrypted security key from which the double-encrypted security key 270 was generated.

The access device 107 may be configured to execute various applications, such as a file decrypter 259, a file viewer 261, and other applications or services. The file decrypter 259 is executed to decrypt a secured file 227 using a double-encrypted security key 270 obtained from the authenticator device 106. The file viewer 261 is executed to facilitate viewing or other ingestion or processing of a secured file 227 that is decrypted by the file decrypter 259. In some embodiments, the functionality described herein as a part of the file viewer 261 and file decrypter 259 can be combined into a single application or invoked via an application programming interface (API) calls.

Next, a general description of the operation of the various components of the networked environment 200 is provided. To begin, the file storage application 216 can facilitate encryption of files with a security key on behalf of a user or organization. A file can be encrypted or secured with a security key and stored as a secured file 227 in the data store 213 as file data 221 by the file storage application 216. For example, a user may upload a file or cause a file to be uploaded by an application configured to synchronize files between the computing environment 203 and the access device 107. Such a file can be received by the file storage application 216. A security key corresponding to the file or a collection of keys, one of which corresponds to the file, can be generated by the file storage application 216 and used as an encryption key with which a secured file 227 is generated. Then, the file storage application 216 can encrypt the security key as an encrypted security key 229 with a public key 230 corresponding to the user and/or access device 107 with which the file is associated or to whom the file belongs.

It should be appreciated that in some embodiments, a copy of the public key 230 may not be stored in association with each secured file 227 and that a single copy of a public key 230 may be stored in association with a particular user account or an organization account within the data store 213. Additionally, in some embodiments, a unique encrypted security key 229 may or may not be generated for each secured file 227 that is stored by the file storage application 216 in the data store 213. In certain scenarios, the file storage application 216 may employ a single security key that is in turn encrypted with a single public key 230, where the same security key is employed to generate secured files 227 that correspond to various files stored by or on behalf of users or organizations within the computing environment 203. By generating the security key or obtaining the security key from a source other than the user or the access device 107, the file storage application 216 can store a file in a manner such that a decryption key for a secured file 227 is not available to the access device 107. Additionally, by encrypting the security key with the public key 230 as an encrypted security key 229, the decryption key needed to access the secured file 227 is also unavailable to the file storage application 216, as the file storage application 216 can be configured to avoid storing or persisting the unencrypted security key used to generate the secured file 227.

Accordingly, now that a secured file 227 that is protected by an encryption methodology is stored in the data store 213, the file storage application 216 can respond to requests by or on behalf of a user to access the secured file 227. In embodiments of the disclosure, the file storage application 216 can require that in order for a user to access a particular secured file 227, that a pairing relationship be established between a user account and an authenticator device 106 such that the file storage application 216 will only provide an encrypted security key 229 needed to access a secured file 227 to a particular authenticator device 106 executing an authenticator application 257 that provides particular authentication credentials or parameters to the file storage application 216. A process for establishing such a pairing relationship can provide for a public key 230 corresponding to the access device 107 or a user associated with the access device 107 being transmitted to the file storage application 216, which can store the public key 230 in association with a user account or a device account in the data store 213. The file decrypter 259 or any other software executed by the access device 107 can generate or obtain a public key-private key pair and retain the private key 281 on the access device 107. Such a pairing relationship can also be established in a manner that allows the authenticator device 106 and access device 107 to exchange a shared secret from which a one-time password or a time-varying password can be later generated that will facilitate decryption of a double-encrypted security key 270.

In some embodiments, the file storage application 216 can authenticate a request to access a secured file 227 with a username/password pair or other form of user authentication credentials. In some embodiments, the file storage application 216 can be configured to only provide a copy of the secured file 227 to a particular access device 107 based upon a hardware identifier associated with the access device 107, such as a media access control (MAC) address. Upon receiving a request to access a secured file 227, the file storage application 216 can provide the secured file 227 to the file decrypter 259 or file viewer 261 executed by the access device 107 but not the encrypted security key 229. The encrypted security key 229 can be transmitted or pushed to the authenticator application 257 executed by the authenticator device 106.

The authenticator device 106 can generate a time-varying password that can be used to encrypt the encrypted security key 229 in order to generate a double-encrypted security key 270. In other words, the authenticator application 257 can apply an additional encryption layer to the encrypted security key 229 based upon the time-varying password generated by the authenticator application 257. The time-varying password can be used as an encryption key that is used to apply the additional encryption layer. In one embodiment, such a time-varying password can be generated from a time code that corresponds to at least a portion of the current time. Such a time code can be combined with a shared secret that can be pre-shared between the authenticator device 106 and access device 107 as a part of the above-referenced pairing process. Such a time code can also be combined with a password or PIN that is provided by the user from which time-varying passwords should be generated. For example, the time code can be concatenated onto or otherwise combined with such a shared secret, password or PIN to form a time-varying password.

In some embodiments, the time code can represent a truncation of the current time so that a corresponding time code generated by the access device 107 that is generated some quantum of time later, such as seconds or minutes later, matches the time code generated by the authenticator application 257. For example, the time code, in some embodiments, can represent a truncation of the current time such that the seconds are removed from the time code so that a corresponding time code generated by the access device 107 sixty seconds after the generation of the time code matches the time code. In another scenario, a corresponding time code generated by the access device 107 that is within a certain of a time code generated by the authenticator device 106 can also form an acceptable time code such that a range of acceptable time codes can be employed.

Upon generating a time-varying password, the authenticator application 257 can encrypt the encrypted security key 229 using the time-varying password to generate the double-encrypted security key 270. For example, the authenticator application 257 can generate a keyed-hash message authentication code (HMAC) where the cryptographic key is the time-varying password and the message-content encrypted is the encrypted key 229. In other words, the authenticator application 257 can execute an HMAC algorithm, such as SHA1, SHA256, etc., where the inputs are the time-varying password and the encrypted security key 229.

In another scenario, the time-varying password can be used as an input to a hash function or cryptographic hash function to generate an output. The output of such a hash function can then be employed as an encryption key with which the additional encryption layer is applied to the encrypted security key 229 in order to generate the double-encrypted security key 270. In yet another scenario, the time-varying password itself can be employed as an encryption key that is used to generate the double-encrypted security key 270 from the security key 229.

Upon generating the double-encrypted security key 270, the authenticator application 257 can provide the double-encrypted security key 270 to the file decrypter 259 executed by the access device 107, which is tasked with decrypting the secured file 227 obtained from the file storage application 216. In one embodiment, an application executed by the access device 107, such as the file viewer 261 or the file decrypter 259, can prompt a user to obtain an authenticator code, or the double-encrypted security key 270 from the authenticator device 106, when the user attempts to access a secured file 227 via the file viewer 261 and/or file decrypter 259. In some embodiments, the file viewer 261 can transmit a request to the authenticator application 257 with data identifying the secured file 227 so that the authenticator application 257 can obtain an encrypted security key 229 corresponding to the secured file 227 and from which the double-encrypted security key 270 can be generated.

As noted above, the double-encrypted security key 270 can be embedded within a QR code or other visual data representation that is displayed on a display of the authenticator device 106. The double-encrypted security key 270 can also be transmitted via an NFC capability from the authenticator device 106 to the access device 107. As noted above, the authenticator application 257 can also generate an audible data representation of the double-encrypted security key 270 that is emitted via a speaker of the authenticator device 106. The access device 107 can capture the audible representation via one or more microphones integrated within the access device 107. By employing a localized communication interface or capability of the authenticator device 106 and access device 107, in order to obtain the double-encrypted security key 270, the authenticator device 106 and access device 107 can be required to be in proximity with one another.

Upon receiving the double-encrypted security key 270, the file decrypter 259 can remove the first layer of encryption from the double-encrypted security key 270. In other words, the file decrypter 259 can decrypt the layer of encryption applied to the encrypted security key 229 by the authenticator application 257. In order to do so, the file decrypter 259 can generate the time-varying password that was generated by the authenticator application 257 to apply the second layer of encryption. As noted above, the time-varying password is based upon a time code corresponding to the current time or a truncation of the current time as well as a shared secret that is either shared between the authenticator device 106 and the access device 107 or known to the user, such as a password or PIN. Accordingly, the file decrypter 259 can generate the same time-varying password as was generated by the authenticator application 257 so long as it does so within a period of time after the time-varying password was generated by the authenticator application 257. Such a period of time can vary depending upon the precision of the time code used to generate the time-varying password by the authenticator application 257.

Upon generating the time-varying password, the file decrypter 259 can use the time-varying password to remove the second layer of encryption applied to the double-encrypted security key 270. In other words, the file decrypter 259 can extract the encrypted security key 229 from the double-encrypted security key 270. Next, because, as noted above, the encrypted security key 229 was encrypted using a public key 230 corresponding to a private key 281 associated with the access device 107, the file decrypter can extract the security key used to generate the secured file 227 from the encrypted security key 229 by decrypting the encrypted security key 229 using the private key 281.

The security key can then be used by the file decrypter 259 to access the secured file 227 obtained from the file storage application 216. As noted above, the security key can comprise an encryption key employed as a part of a symmetric encryption process to generate the secured file 227 from a file associated with the user or a particular organization to which the file belongs. The security key may also comprise a password that is used to password protect access to the file. The file decrypter 259 can be configured to decrypt or otherwise access a secured file 227 as well as be configured to only store the security key, the encrypted security key 229 and/or double-encrypted security key 270 in volatile memory. In other words, the file decrypter 259 can be configured as a trusted application that does not persist the security key, the encrypted security key 229 and/or double-encrypted security key 270 associated with a particular secured file 227 in non-volatile memory, mass storage, or in any other portion of the access device 107 in which they may be accessed by any other application or service that is not authorized to do so. In some embodiments, the security key, the encrypted security key 229 and/or double-encrypted security key 270 can only be manipulated in a trusted or secure memory portion of the access device 107. In some embodiments, the file decrypter 259 can also be configured to discard the security key, the encrypted security key 229 and/or double-encrypted security key 270 from memory upon decryption of a file. In this way, the security key, the encrypted security key 229 and/or double-encrypted security key 270 are not retained within the access device 107 once a secured file 227 has been decrypted or otherwise accessed by the file decrypter 259.

Upon decryption of the secured file 227, the file decrypter 259 can provide the file to the file viewer 261, which can facilitate viewing, printing or other consumption of the contents of the file by a user using the access device 107. The file viewer 261 can also be configured as a trusted application that does not persist the decrypted version of the secured file 227 or any portion thereof in non-volatile memory, mass storage, or in any other portion of the access device 107 in which they may be accessed by any other application or service that is not authorized to do so. In some embodiments, the file viewer 261 can also be configured to discard portions of a decrypted version of the secured file 227 when a user terminates a session associated with viewing the file in the file viewer 261 or when a particular decrypted portion of the secured file 227 are no longer displayed by the file viewer 261. In this way, neither the security key nor the decrypted version of the secured file 227 persist on the access device 107.

In some embodiments, the file storage application 216 can generate encrypted keys 229 corresponding to a particular secured file 227 in the event that a particular user account or organizational account is associated with multiple computing devices 107 that are associated with different public key 227 private key 281 pairs. In such a scenario, the file storage application 216 can generate more than one encrypted security key 229 that is encrypted with each respective public key 227 associated with the user account. Accordingly, in response to a request to access a secured file 227, the file storage application 216 can provide the multiple encrypted keys 229 to the authenticator application 257, which can in turn generate multiple double-encrypted keys 270 that can be transmitted to the access device 107.

In some embodiments, in response to a request to invoke the authenticator application 257 to display a QR code in which the double-encrypted security keys 270 are embedded, the authenticator application 257 can embed the multiple double-encrypted security keys 270 in such a QR code or other data representation of the double-encrypted security keys 270. The double-encrypted security keys 270 can be embedded in such a data representation along with metadata identifying a particular access device 107 or public key 227 to which each of the double-encrypted encrypted security keys 270 that are embedded therein correspond. In this way, the file decrypter 259 can identify which of the double-encrypted security keys 270 have been encrypted with the public key 227 corresponding to the access device 107 or user to which the particular instance of the file decrypter 259 corresponds.

Figure 3:
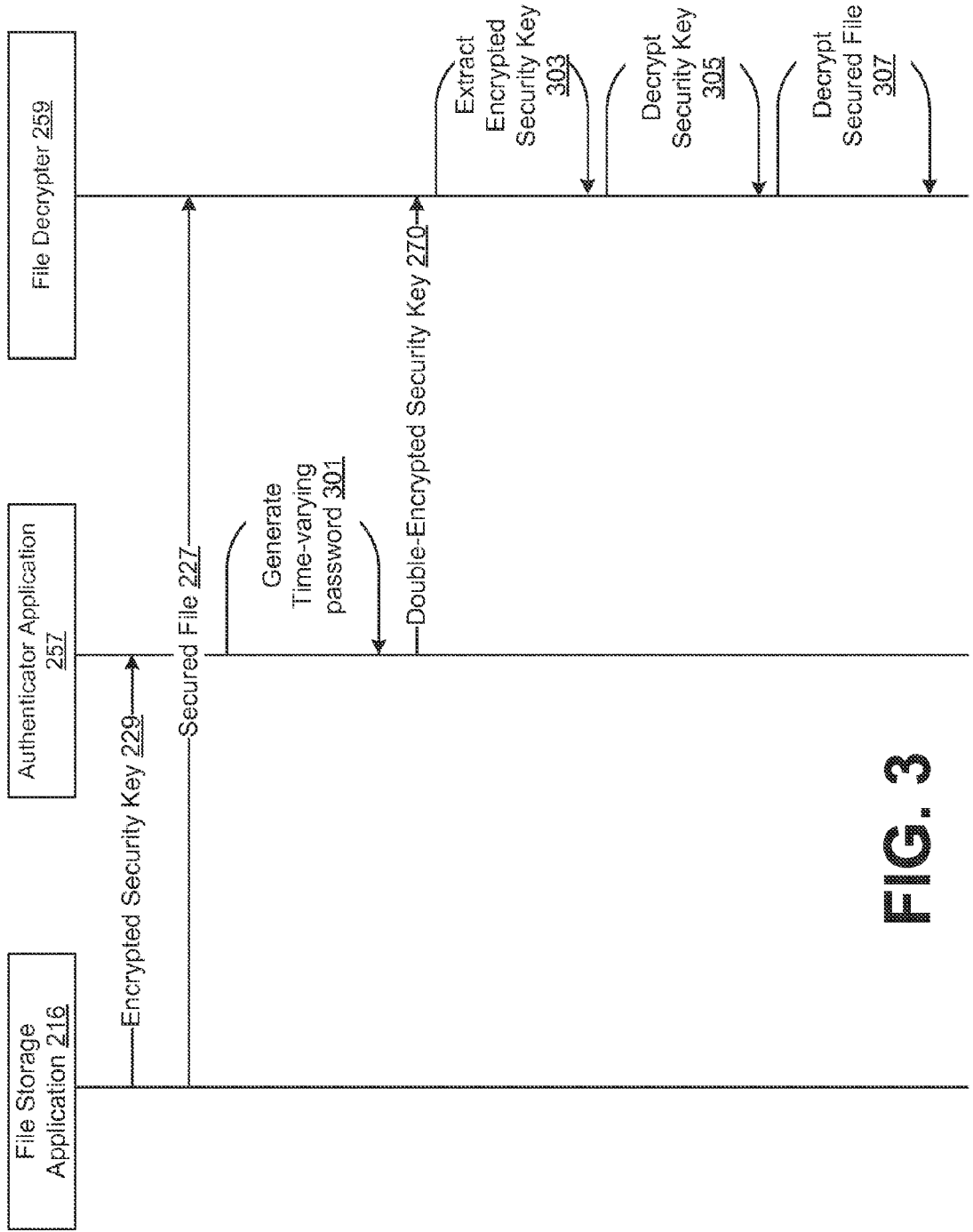
FIG. 3 is a sequence diagram illustrating operation of devices in the networked environment of FIG. 2 according to various embodiments of the present disclosure.

Referring next to FIG. 3, shown is an example sequence diagram that illustrates one example of interactions between the various components illustrated in the example networked environment 200 of FIG. 2. FIG. 3 illustrates an example of the file storage application 216 that has received a request to access a secured file 227 on behalf of a particular user or organization. Upon authentication of the user and/or the access device 107 from which the user is attempting to access the secured file 227, the file storage application can provide the encrypted security key 229 corresponding to the secured file 227 to the authenticator application 257 executed by the authenticator device 106. The file storage application 216 can also provide the secured file 229 to the file decrypter 259 executed by the access device 107. In this way, the encrypted security key 229 and the secured file 227 are not provided to the same device. Additionally, in order to access the secured file 227 via the access device 107, proximity to or communication with the authenticator device 106 can be required. In other words, in order to access the secured file 227, the user can be required to authenticate himself or herself using a separate authenticator device 106. In some embodiments, in order to access the secured file 227, the authenticator device 106 and access device 107 can also authenticate physical presence with respect to one another by providing location data, such as global positioning system (GPS) location data, network location data (e.g., Wi-Fi media access control data, internet protocol address data) to the file storage application 216 before the file storage application 216 provides the encrypted security key 229 to the authenticator device 106.

Next, the authenticator device 106 can generate a time-varying password at arrow 301. As noted above, such a time-varying password can be used to apply an additional encryption layer to the encrypted security key 229. Then, the authenticator application 257 executed by the authenticator device 106 can transmit the double-encrypted security key 270 to the file decrypter 259 executed by the access device 107. As described above, the double-encrypted security key 270 can be transmitted to the file decrypter 259 via a localized communication interface.

Upon receiving the double-encrypted security key 270, the file decrypter 259 can extract the encrypted security key 229 by generating the time-varying password with which the security key 229 can be accessed at arrow 303. Next, the file decrypter 259 can decrypt the encrypted security key 229 to access the security key associated with the secured file 227 using the private key 281 corresponding to the public key 227 with which the encrypted security key 229 was generated at arrow 305. Next, the file decrypter 259 can decrypt the secured file 227 using the security key extracted from the encrypted security key 229 at arrow 307. In some embodiments, the security key extracted from the encrypted security key 229 can correspond to a security key that is used to access a collection of security keys from which a file-specific security key is extracted.

Figure 4A:
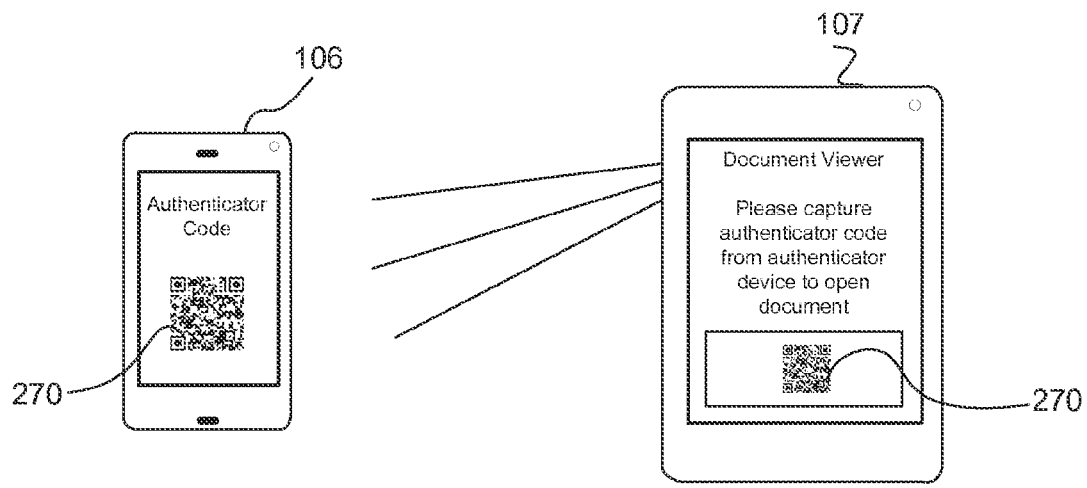
FIGS. 4A-4B are drawings of an example scenario according to various embodiments of the present disclosure.
Figure 4B:
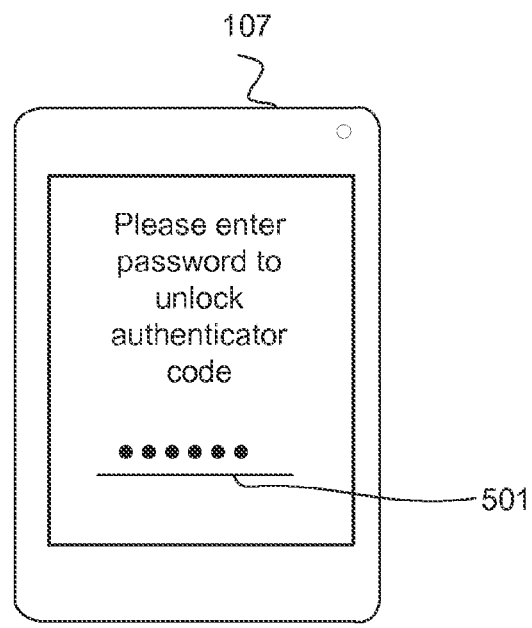

Referring next to FIG. 4A and FIG. 4B, shown is a scenario illustrating how the time-varying password generated by the file decrypter 259 executed by the access device 107 can require the user to enter a password and/or PIN in order to generate a time-varying password in order to remove the additional encryption layer applied to the encrypted security key 229 by the authenticator application 257 when the double-encrypted security key 270 is generated. As shown in FIG. 4A, just as in the example of FIG. 1, a user can be prompted by the file decrypter 259 executed by the access device 107 to obtain an authenticator code, or a double-encrypted security code 270, from the authenticator application 257. Accordingly, the user may invoke the authenticator application 257 executed by the authenticator device 106, which can generate a QR code in which the double-encrypted security key 270 is embedded.

Accordingly, the file decrypter 259 executed by the access device 107 can capture the double-encrypted security key 270. Referring next to FIG. 4B, the file decrypter 259 can then prompt the user to provide a password, PIN, biometric authentication data, or other authentication mechanisms with which the time-varying password was generated in order to apply the second encryption layer to the double-encrypted security key 270. In this way, the file decrypter 259 can also require user authentication of an authentication credential in order to confirm that a user attempting to access a secured file 227 is authorized to do so.

Figure 5:
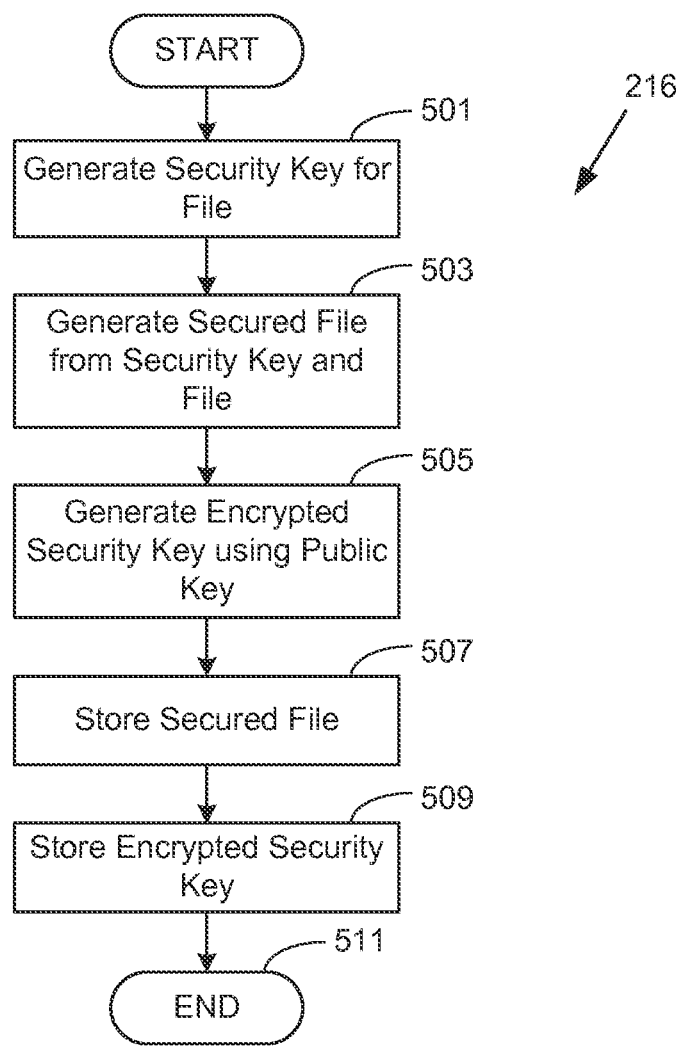
FIGS. 5-8 are flowcharts illustrating examples of functionality implemented as portions of components executed in the networked environment of FIG. 2 according to various embodiments of the present disclosure.

Referring next to FIG. 5, shown is a flowchart that provides one example of the operation of a portion of the file storage application 216 according to various embodiments. It is understood that the flowchart of FIG. 5 provides merely an example of the many different types of functional arrangements that may be employed to implement the operation of the portion of the file storage application 216 as described herein. As an alternative, the flowchart of FIG. 5 may be viewed as depicting an example of elements of a method implemented in the computing environment 203 (FIG. 2) according to one or more embodiments. Functionality attributed to the file storage application 216 can be implemented in a single process or application executed by the computing environment 203 and/or multiple processes or applications. The separation or segmentation of functionality as discussed herein is presented for illustrative purposes only.

Beginning with box 501, the file storage application 216 can generate a security key in response to a request to store a file in association with a particular user account or organizational account in the data store 213. At box 503, the file storage application 216 can generate a secured file 227 from the security key by encrypting or password-protecting the file using the security key. At box 505, the file storage application 216 can generate one or more encrypted security key 229 using one or more public key 227 corresponding to a user, organization or access device 107. In some embodiments, the security key embedded within the encrypted security key 229 can correspond to a security key that is used to access a collection of security keys from which a file-specific security key is extracted.

At box 507, the file storage application 216 stores the secured file 227 in the data store 213. In this way, the unsecured or unencrypted file can avoid being stored in the data store 213. At box 509, the file storage application 216 can store the one or more encrypted security key 229 generated using the respective public key 227. In this way, the unencrypted security key can avoid being stored in the data store 213, and the file storage application 216 would not have access to the private key 281 needed to decrypt the encrypted security key 229. At box 511, the process proceeds to completion.

Figure 6:
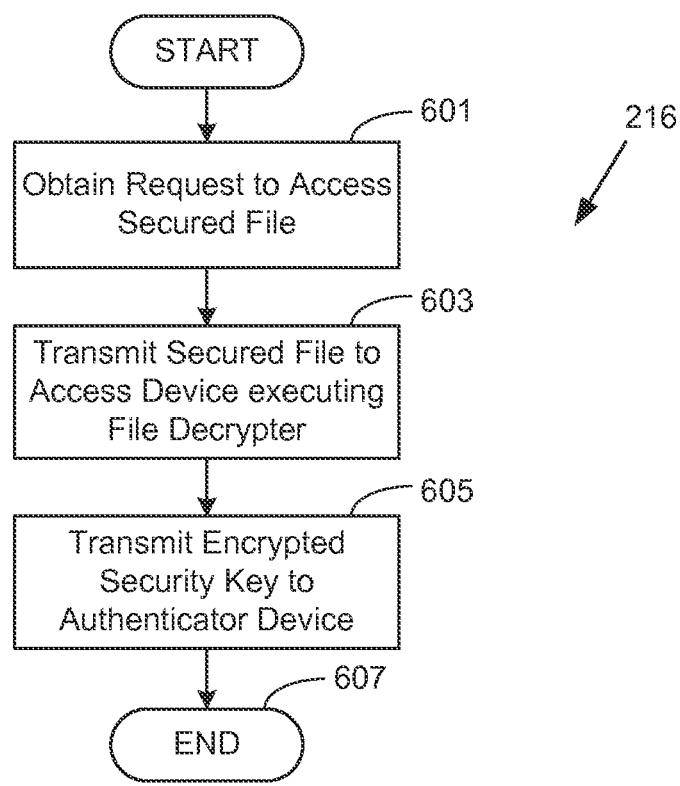

Referring next to FIG. 6, shown is a flowchart that provides one example of the operation of a portion of the file storage application 216 according to various embodiments. It is understood that the flowchart of FIG. 6 provides merely an example of the many different types of functional arrangements that may be employed to implement the operation of the portion of the file storage application 216 as described herein. As an alternative, the flowchart of FIG. 6 may be viewed as depicting an example of elements of a method implemented in the computing environment 203 (FIG. 2) according to one or more embodiments. Functionality attributed to the file storage application 216 can be implemented in a single process or application executed by the computing environment 203 and/or multiple processes or applications. The separation or segmentation of functionality as discussed herein is presented for illustrative purposes only.

Beginning with box 601, the file storage application 216 can obtain a request to access a secured file 227 stored in the data store 213 on behalf of a particular user, access device 107 and/or organization. At box 603, the file storage application 216 can transmit the secured file 227 to an access device 107 that is executing a file decrypter 259. In some embodiments, the file storage application 216 can authenticate the access device 107 and/or the user prior to transmitting the secured file 227. At box 605, the file storage application 216 can transmit the one or more encrypted security key 229 corresponding to the secured file 227 to the authenticator device 106. In this way, the secured file 227 and the encrypted security key 229 are provided to different computing devices so that a user can be required to obtain the encrypted security key 229 from the authenticator device 106 to access the secured file 227 on the access device 107. In some embodiments, the security key embedded within the encrypted security key 229 can correspond to a security key that is used to access a collection of security keys from which a file-specific security key is extracted.

Figure 7:
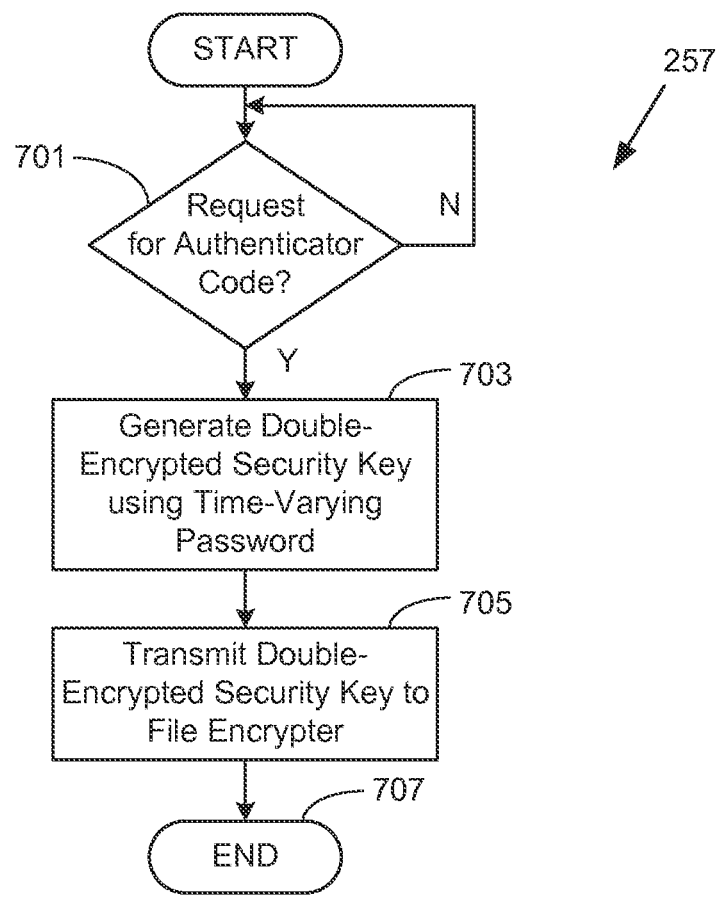

Referring next to FIG. 7, shown is a flowchart that provides one example of the operation of a portion of the authenticator application 257 according to various embodiments. It is understood that the flowchart of FIG. 7 provides merely an example of the many different types of functional arrangements that may be employed to implement the operation of the portion of the authenticator application 257 as described herein. As an alternative, the flowchart of FIG. 7 may be viewed as depicting an example of elements of a method implemented in the computing environment 203 (FIG. 2) according to one or more embodiments. Functionality attributed to the authenticator application 257 can be implemented in a single process or application executed by the authenticator device 106 and/or multiple processes or applications. The separation or segmentation of functionality as discussed herein is presented for illustrative purposes only.

Beginning with box 701, the authenticator application 257 can obtain a request to access an authenticator code, or a double-encrypted security key 270, on behalf of an access device 107 associated with a user. Such a request can take the form of a user executing the authenticator application 257 on the authenticator device 106 or the authenticator application 257 receiving a request from the access device 107. Such a request can also be generated in response to a file decrypter 259 executed by the access device 107 attempting to access a secured file 227. If such a request is received, then at box 703, the authenticator application 257 can generate a double-encrypted security key 270 that is encrypted based upon a time-varying password generated by the authenticator application 257. At box 705, the authenticator application 257 can transmit the double-encrypted security key 270 to the file decrypter 259 executed by the access device 107. Thereafter, the process proceeds to completion at box 707.

Figure 8:
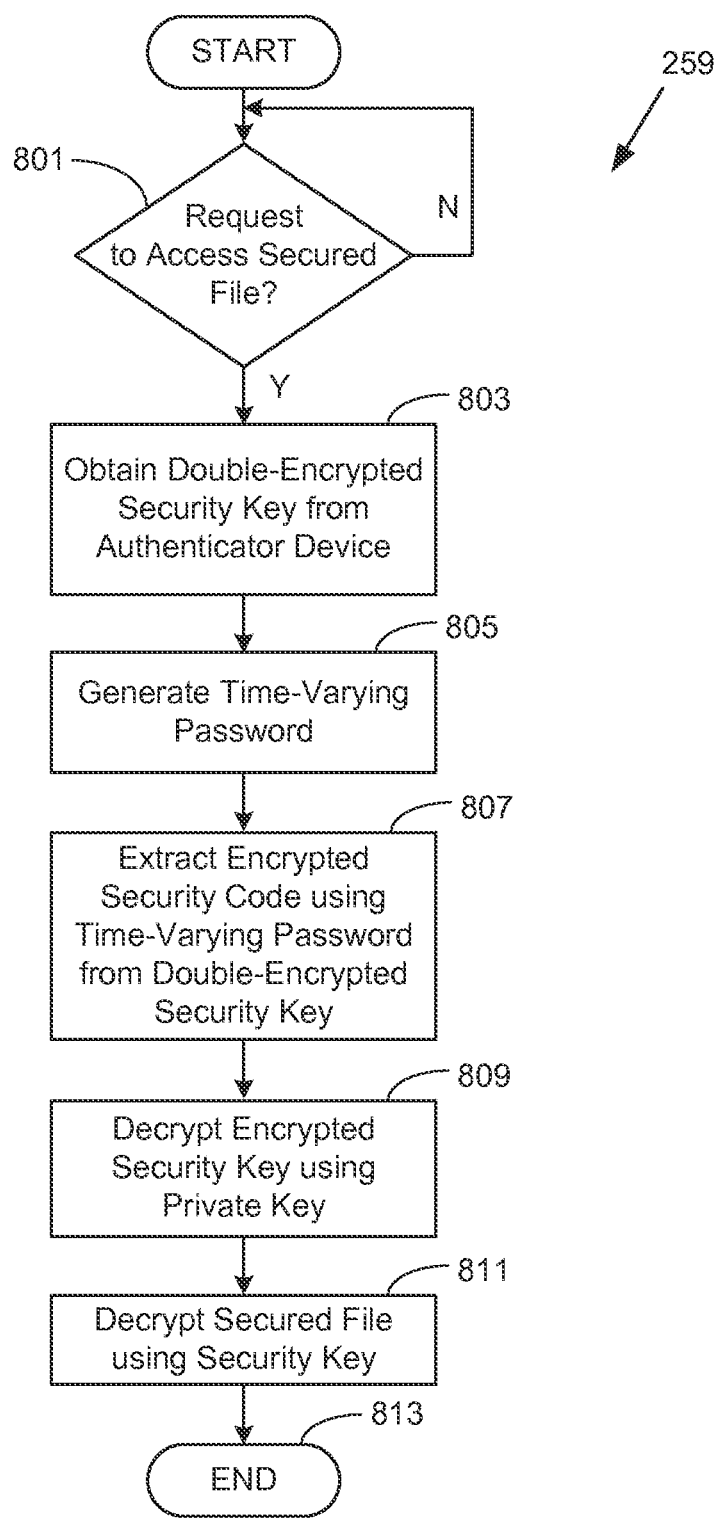

Referring next to FIG. 8, shown is a flowchart that provides one example of the operation of a portion of the file decrypter 259 accessing a secured file 227 according to various embodiments. It is understood that the flowchart of FIG. 8 provides merely an example of the many different types of functional arrangements that may be employed to implement the operation of the portion of the authenticator application 257 as described herein. As an alternative, the flowchart of FIG. 8 may be viewed as depicting an example of elements of a method implemented in the computing environment 203 (FIG. 2) according to one or more embodiments. Functionality attributed to the authenticator application 257 can be implemented in a single process or application executed by the authenticator device 106 and/or multiple processes or applications. The separation or segmentation of functionality as discussed herein is presented for illustrative purposes only.

Beginning with box 801, the file decrypter 259 can obtain a request to access a secured file 227 obtained from the file storage application 216 on behalf of a access device 107 associated with a user. Such a request can take the form of a user attempting to access a particular file via the file storage application 216 or a storage account of the user. If such a request is received, then at box 803, the file decrypter 259 can obtain a double-encrypted security key 270 that is encrypted based upon a time-varying password generated by the authenticator application 257 from an authenticator device 106. At box 805, the file decrypter 259 can generate a time-varying password in order to remove the first encryption layer from the double-encrypted security key 270.

At box 807, the file decrypter 259 can remove the first encryption layer from the double-encrypted security key 270 using the time-varying password. In other words, the file decrypter 259 can extract the encrypted security key 229 from the double-encrypted security key 270. At box 809, the file decrypter 259 can then decrypt the encrypted security key 229 using the private key 281 stored on or accessible to the access device 107 to extract the security key associated with the secured file 227. At box 811, the file decrypter 259 can then decrypt the secured file 227 using the security key extracted from the double-encrypted security key 270. In some embodiments, the security key embedded within the encrypted security key 229 can correspond to a security key that is used to access a collection of security keys from which a file-specific security key is extracted. Thereafter, the process proceeds to completion at box 813.

The authenticator device 106, access device 107 or computing devices comprising the computing environment 203 can include at least one processor circuit, for example, having a processor and at least one memory device, both of which are coupled to a local interface, respectively. Such a device may comprise, for example, at least one computer, a mobile device, smartphone, computing device or like device. The local interface may comprise, for example, a data bus with an accompanying address/control bus or other bus structure as can be appreciated.

Stored in the memory device are both data and several components that are executable by the processor. In particular, stored in the one or more memory device and executable by the processor of such a device can be the authenticator application 257, file decrypter 259, the file storage application 216, and potentially other applications. Also stored in the memory may be a data store 213 and other data.

A number of software components are stored in the memory and are executable by a processor. In this respect, the term "executable" means a program file that is in a form that can ultimately be run by the processor. Examples of executable programs may be, for example, a compiled program that can be translated into machine code in a format that can be loaded into a random access portion of one or more of the memory devices and run by the processor, code that may be expressed in a format such as object code that is capable of being loaded into a random access portion of the one or more memory devices and executed by the processor, or code that may be interpreted by another executable program to generate instructions in a random access portion of the memory devices to be executed by the processor, etc. An executable program may be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor may represent multiple processors and/or multiple processor cores, and the one or more memory devices may represent multiple memories that operate in parallel processing circuits, respectively. Memory devices can also represent a combination of various types of storage devices, such as RAM, mass storage devices, flash memory, hard disk storage, etc. In such a case, a local interface may be an appropriate network that facilitates communication between any two of the multiple processors, between any processor and any of the memory devices, etc. The local interface may comprise additional systems designed to coordinate this communication, including, for example, performing load balancing. The processor 503 may be of electrical or of some other available construction.

The computing device 106 may include a display upon which a user interface generated by the file storage application 216 or another application can be rendered. The computing device 106 may also include one or more input/output devices that may include, for example, a capacitive touch-screen or other type of touch input device, fingerprint reader, keyboard, etc.

Although the file storage application 216 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram and flowcharts show an example of the functionality and operation of an implementation of portions of components described herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the sequence diagram flowcharts show a specific order of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some embodiments, one or more of the blocks shown in the drawings may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, solid-state drives, flash memory, etc. Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices. Additionally, it is understood that terms such as "application," "service," "system," "engine," "module," and so on may be interchangeable and are not intended to be limiting.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed by the computing device, being configured to cause the computing device to at least:
   receive an encrypted security key from a computing environment in the computing device, the encrypted security key corresponding to a secured file and being encrypted using a public key associated with a second computing device on which the secured file is accessed;
   generate a time-varying password in the computing device, the time-varying password based at least in part upon a shared secret between the computing device and the second computing device;
   generate a double-encrypted security key by encrypting the encrypted security key based at least in part upon the time-varying password; and
   transmit the double-encrypted security key to the second computing device via a localized communication mechanism, wherein the second computing device is configured to independently generate the time-varying password and decrypt the double-encrypted security key using the time-varying password and a private key corresponding to the public key, wherein the security key is employed by the second computing device to access the secured file or a collection of keys associated with the secured file.

2. The non-transitory computer-readable medium of claim 1, wherein the localized communication mechanism comprises a quick-response (QR) code generated on a display associated with the computing device, wherein the double-encrypted security key is embedded within the QR code.

3. The non-transitory computer-readable medium of claim 1, wherein the localized communication mechanism comprises a data representation in which the double-encrypted security key is embedded, wherein the data representation is transmitted to the second computing device via at least one of: near-field communication (NFC), an audible communication, or a Bluetooth transmission.

4. The non-transitory computer-readable medium of claim 1, wherein the computing device generates the time-varying password by seeding a hash function with at least a portion of a time code corresponding to at least a portion of a current time and the shared secret.

5. The non-transitory computer-readable medium of claim 4, wherein the hash function comprises a Secure Hash Algorithm or a pseudo-random number generator.

6. The non-transitory computer-readable medium of claim 4, wherein the time code corresponds to a truncation of the current time.

7. The non-transitory computer-readable medium of claim 1, wherein the shared secret comprises at least one of a password or a personal identification number (PIN).

8. The non-transitory computer-readable medium of claim 1, wherein the computing device generates the double-encrypted security key by generating a keyed-hash message authentication code based at least in part upon the encrypted security key and the time-varying password.

9. The non-transitory computer-readable medium of claim 8, wherein the keyed-hash message authentication code is transmitted to the second computing device as the double-encrypted security key.

10. A system, comprising:
    a computing device;
    programming code executable in the computing device, the programming code comprising:
      logic that receives a request to access a secured file via the computing device;
      logic that obtains a data representation of a double-encrypted security key from an authenticator device, the double-encrypted security key comprising a security key corresponding to the secured file or a collection of keys associated with the secured file;
      logic that generates a time-varying password based upon a current time and a shared secret corresponding to the time-varying password;
      logic that generates an encrypted security key by removing a first layer of encryption from the double-encrypted security key, the first layer of encryption being removed based at least in part upon the time-varying password; and
      logic that extracts the security key from the encrypted security key by removing a second layer of encryption from the double-encrypted security key, the second layer of encryption being removed based at least in part upon a private key, wherein the second layer of encryption is applied using a public key corresponding to the private key.

11. The system of claim 10, wherein the logic that generates the time-varying password further comprises logic that seeds a hash function with a time code corresponding to a current time and a shared secret between the computing device and the authenticator device from which the double-encrypted security key is obtained.

12. The system of claim 11, wherein the first layer of encryption is removed by extracting a message content from a keyed-hash message authentication code, wherein a key associated with the keyed-hash message authentication code is based upon the time code and the shared secret.

13. The system of claim 10, further comprising logic that decrypts the secured file using the security key.

14. The system of claim 13, further comprising logic that discards the security key from memory upon decryption of the secured file using the security key.

15. The system of claim 13, further comprising logic that renders the secured file in a file viewer upon decryption of the secured file using the security key.

16. The system of claim 15, further comprising logic that discards the secured file upon termination of a session of the file viewer in which the secured file is rendered.

17. The system of claim 15, further comprising logic that discards a portion of the secured file upon viewing of the portion of the secured file in the file viewer in which the secured file is rendered.

18. A method, comprising:
obtaining, within a server, a request to store a file in association with a storage account associated with at least one of a user or at least one computing device;
generating, within the server, a security key corresponding to at least one of the file or the storage account;
generating, within the server, a secured file corresponding to the file based at least in part upon the security key;
storing, via the server, the secured file in storage accessible to the server;
identifying, within the server, at least one public key corresponding to the storage account;
generating, within the server, at least one encrypted security key corresponding to the security key, the at least one encrypted security key being encrypted using the at least one public key corresponding to the storage account; and
storing, via the server, the at least one encrypted security key in storage accessible to the server.

19. The method of claim 18, further comprising:
receiving, in the server, a request to access the secured file;
transmitting, from the server, the at least one encrypted security key to an authenticator device associated with the storage account; and
transmitting, from the server, the secured file to an access device associated with the authenticator device.

20. The method of claim 19, wherein the server is configured to only transmit the encrypted security key to the authenticator device.

21. The method of claim 18, wherein the at least one security key corresponds to a plurality of encrypted security keys, wherein each of the plurality of encrypted security keys is encrypted using a respective public key corresponding to a respective computing device.

* * * * *